United States Patent
Xiao et al.

(10) Patent No.: US 9,860,808 B2
(45) Date of Patent: Jan. 2, 2018

(54) METHOD FOR HANDOVER JUDGMENT IN COORDINATED MULTIPLE POINT

(71) Applicant: HUAWEI TECHNOLOGIES CO., LTD., Shenzhen, Guangdong (CN)

(72) Inventors: Dengkun Xiao, Shenzhen (CN); Yuxiang Zhang, Shenzhen (CN); Qing Yang, Shenzhen (CN); Hong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 14/467,127

(22) Filed: Aug. 25, 2014

(65) Prior Publication Data
US 2014/0364129 A1 Dec. 11, 2014

Related U.S. Application Data

(63) Continuation of application No. PCT/CN2013/071811, filed on Feb. 25, 2013.

(30) Foreign Application Priority Data

Feb. 24, 2012 (CN) .......................... 2012 1 0043503

(51) Int. Cl.
H04W 36/04 (2009.01)
H04W 36/00 (2009.01)
(Continued)

(52) U.S. Cl.
CPC ....... H04W 36/04 (2013.01); H04W 36/0083 (2013.01); H04B 7/024 (2013.01); H04L 5/0035 (2013.01); H04L 5/0048 (2013.01)

(58) Field of Classification Search
CPC ...... H04B 7/024; H04B 7/0452; H04B 7/022; H04B 7/0632; H04B 7/0413;
(Continued)

(56) References Cited

U.S. PATENT DOCUMENTS

2010/0265842 A1 10/2010 Khandekar et al.
2011/0028156 A1* 2/2011 Zhu .................... H04B 7/024
                                                          455/450
(Continued)

FOREIGN PATENT DOCUMENTS

CN 102170330 A 8/2011
CN 102186215 A 9/2011
(Continued)

OTHER PUBLICATIONS

Xu Xiaodong, Chen Xin, Li Jingya, "Handover Mechanism in Coordinated Multi-Point Transmission/Reception System", Mar. 21, 2010, ZTE Communications; http://wwwen.zte.com.cn/endata/magazine/ztecommunications/2010Year/no1/articles/201003/t20100321_181530.html.*

(Continued)

*Primary Examiner* — Allahyar Kasraian
(74) *Attorney, Agent, or Firm* — Staas & Halsey LLP

(57) ABSTRACT

Embodiments of the present invention disclose a handover method and a related user equipment and system, which are used for handover judgment in a CoMP handover scenario. The method according to an embodiment of the present invention includes: obtaining a first reference signal parameter Mn of a target node in a macro neighboring cell and second reference signal parameters Mp corresponding to multiple nodes in a macro serving cell, where the macro serving cell is a cell serving a user equipment UE and the macro neighboring cell is a cell adjacent to the macro serving cell; selecting a preferred Mp that meets a predefined requirement from the Mps corresponding to the multiple nodes; and triggering a handover procedure if the preferred Mp and the Mn meet a preset handover condition. By implementing the solutions in the present invention, (Continued)

---

201 — A user equipment UE obtains a first reference signal parameter Mn of a target node in a macro neighboring cell and second reference signal parameters Mps corresponding to multiple nodes in a macro serving cell 202 — The user equipment UE selects a preferred Mp that meets a predefined requirement from the Mps corresponding to the multiple nodes 203 — Trigger a handover procedure if the preferred Mp and the Mn meet a preset handover condition throughput of a communications system after a UE handover can be increased.

9 Claims, 4 Drawing Sheets

(51) Int. Cl.
*H04L 5/00* (2006.01)
*H04B 7/024* (2017.01)

(58) Field of Classification Search
CPC ... H04L 5/0035; H04L 5/0032; H04L 5/0048; H04J 11/0093; H04J 11/0086; H04W 36/0072; H04W 24/10; H04W 36/30; H04W 36/0083; H04W 36/0077; H04W 36/04; H04W 36/18; H04W 72/0426
USPC ........................... 455/436–444; 370/331–333
See application file for complete search history.

(56) References Cited

U.S. PATENT DOCUMENTS

| | | | |
|---|---|---|---|
| 2012/0122515 A1* | 5/2012 | Han | H04W 36/32 455/525 |
| 2012/0190365 A1* | 7/2012 | Jeong | H04W 36/30 455/436 |
| 2013/0017833 A1* | 1/2013 | Sakamoto | H04J 11/0053 455/436 |
| 2013/0157665 A1* | 6/2013 | Toda | H04W 28/24 455/436 |

FOREIGN PATENT DOCUMENTS

| | | | |
|---|---|---|---|
| JP | WO 2012105167 A1 * | 8/2012 | ............ H04W 36/30 |
| WO | 2010/039066 A1 | 4/2010 | |
| WO | WO 2010/039066 A1 | 4/2010 | |
| WO | WO 2010/077192 A1 | 7/2010 | |

OTHER PUBLICATIONS

International Search Report dated May 30, 2013, in corresponding International Patent Application No. PCT/CN2013/071811.
Extended European Search Report dated Feb. 10, 2015 in corresponding European Patent Application No. 13751569.8.
"Discussion of Handover for CoMP", Research in Motion UK Limited, 3GPP TSG RAN WG2 Meeting #67, Shenzhen, China, Aug. 2009, pp. 1-6.
"Discussion on CoMP Measurement set Management", Fujitsu, 3GPP TSG-RAN WG2#78 meeting, Prague, Czech Republic, May 2012, pp. 1-4.
"CoMP Measurements", Motorola Mobility, 3GPP TSG-RAN WG2#78, Prague, Czech Republic, May 2012, pp. 1-4.
"3rd Generation Partnership Project; Technical Specification Group Radio Access Network; Coordinated multi-point operation for LTE physical layer aspects (Release 11)", 3GPP TR 36.819 vol. 11.1.0, Dec. 2011, pp. 1-69.
"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, vol. 10.4.0, Dec. 2011, pp. 1-296.
European Office Action dated Mar. 23, 2017 in related European Patent Application 13 751 569.8.
CHTTL: "Discussions on CoMP Cooperating Set", 3GPP Draft; R1-092833, 20090626, Jun. 26, 2009.

* cited by examiner

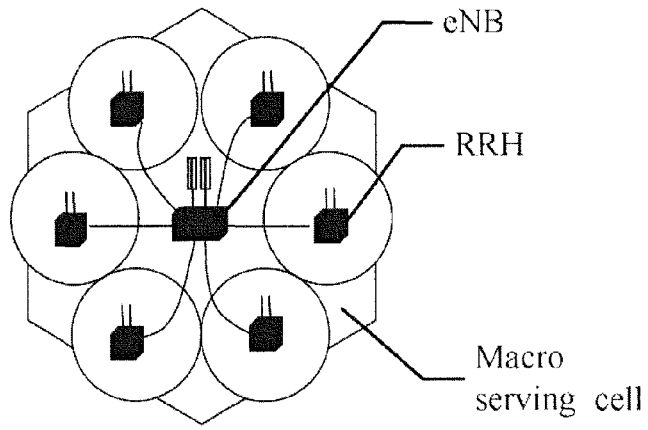

RELATED ART
FIG. 1

201 — A user equipment UE obtains a first reference signal parameter Mn of a target node in a macro neighboring cell and second reference signal parameters Mps corresponding to multiple nodes in a macro serving cell 202 — The user equipment UE selects a preferred Mp that meets a predefined requirement from the Mps corresponding to the multiple nodes 203 — Trigger a handover procedure if the preferred Mp and the Mn meet a preset handover condition

FIG. 2

METHOD FOR HANDOVER JUDGMENT IN COORDINATED MULTIPLE POINT

CROSS-REFERENCE TO RELATED APPLICATION

This application is a continuation of International Application No. PCT/CN2013/071811, filed on Feb. 25, 2013, which claims priority to Chinese Patent Application No. 201210043503.8, filed on Feb. 24, 2012, both of which are hereby incorporated by reference in their entireties.

TECHNICAL FIELD

The present invention relates to the field of mobile communications system technologies, and in particular, to a handover method and a related user equipment and system.

BACKGROUND

In handover scenarios of existing mobile communications systems, a handover procedure is usually triggered by a user equipment (User Equipment, UE). During communication with a currently connected serving node, a UE periodically measures pilot signal strength of a neighboring node. After pilot signal strength of the serving node deceases to below a preset threshold and meanwhile the pilot signal strength of the neighboring node increases to above the preset threshold and stays for a specific time, a handover procedure is triggered. At present, a UE uses an A3 event for handover judgment. The A3 event includes the following two handover conditions, which respectively are:

Condition for entry: $Mn+Ofn+Ocn-Hys>Mp+Ofp+Ocp+Off$; and

Condition for leave: $Mn+Ofn+Ocn+Hys<Mp+Ofp+Ocp+Off$;

where, M is a parameter measured by a UE with respect to a node and may be reference signal received power (Reference Signal Received Power, RSRP) or reference signal received quality (Reference Signal Received Quality, RSRQ); the subscript n indicates that the parameter is related to a neighboring node; the subscript p indicates that the parameter is related to a serving node; Ofn indicates an offset related to a carrier of the neighboring node; Ocn indicates an offset related to coverage of the neighboring node; Ofp indicates an offset related to a carrier of the serving node; Ocp indicates an offset related to coverage of the serving node; and Hys and Off are design parameters, where Hys is a hysteresis. In addition, the preceding parameters are all measured in decibels (dB).

Mobile communications systems of the 3rd Generation Partnership Project (3rd Generation Partnership Project, 3GPP) apply a coordinated multiple point (Coordinated Multiple Point, CoMP) technology, and the CoMP technology is one of important technologies for a system to increase coverage at network edges and ensure quality of service (Quality of Service, QoS) for edge UEs. When the CoMP technology is implemented, multiple nodes coordinate to provide services for a same UE, which increases system throughput. Evolved base stations (E-UTRAN NodeB, eNB) are used in a 3GPP mobile communications system. According to a multi-antenna diversity theory, one eNB can access multiple remote radio headers (Remote Radio Header, RRH), where each RRH can be regarded as a node.

FIG. 1 shows a CoMP work scenario, where an eNB is a primary node and 6 low-power RRHs are disposed under the primary node, and the RRHs can be used as secondary nodes. Each RRH has its own identity (ID). The eNB and the RRHs form a CoMP macro serving cell, and in the macro serving cell, UEs can receive a CoMP service provided by the eNB and the RRHs in coordination. When a UE stays within a service range of a macro serving cell, the macro serving cell provides functions similar to those of the above-mentioned serving node. In addition, the macro serving cell also has other secondary nodes and therefore, in the macro serving cell, the UE has multiple serving nodes.

When a UE moves from a macro serving cell to a macro neighboring cell, a handover procedure needs to be triggered. The current 3GPP mobile communications systems, however, do not stipulate handover policies specific to the foregoing CoMP work scenario. As a result, where there is a need for handover, a UE still uses the A3 event for handover judgment. During the handover, related parameters of a neighboring node need to be measured. In the foregoing CoMP handover scenario, the UE randomly selects a node in the macro neighboring cell, measures related parameters of the node, and uses a measurement result as a criterion for judgment of an A3 event-based handover. The communication effect is unsatisfactory after a handover is performed by using such a handover method. According to test data, system throughput decreases substantially after such a handover because the node measured in the macro neighboring cell is selected randomly.

SUMMARY

To solve the preceding problem, embodiments of the present invention provide a handover method and a related user equipment and system, which are used for handover judgment in a CoMP handover scenario. By using the method in the present invention, throughput of a communications system after a UE handover can be increased.

A handover method includes:

obtaining a first reference signal parameter Mn of a target node in a macro neighboring cell and second reference signal parameters Mp corresponding to multiple nodes in a macro serving cell, where the macro serving cell is a cell serving a user equipment UE and the macro neighboring cell is a cell adjacent to the macro serving cell;

selecting a preferred Mp that meets a predefined requirement from the Mps corresponding to the multiple nodes; and triggering a handover procedure if the preferred Mp and the Mn meet a preset handover condition.

A handover method includes:

when a user equipment UE is at an edge of a macro serving cell, sending, by the macro serving cell, a get instruction to the UE, where the get instruction is used to instruct the UE to obtain a first reference signal parameter Mn of a target node in a macro neighboring cell and second reference signal parameters Mp corresponding to multiple nodes in the macro serving cell, and instruct the UE to select a preferred Mp that meets a predefined requirement from the Mps corresponding to the multiple nodes;

receiving, by the UE, the get instruction from the macro serving cell;

obtaining, by the UE, the first reference signal parameter Mn of the target node in the macro neighboring cell and the second reference signal parameters Mp corresponding to the multiple nodes in the macro serving cell, where the macro serving cell is a cell serving the UE and the macro neighboring cell is a cell adjacent to the macro serving cell;

selecting, by the UE, a preferred Mp that meets the predefined requirement from the Mps corresponding to the multiple nodes; and triggering, by the UE, a handover procedure if the preferred Mp and the Mn meet a preset handover condition.

A user equipment includes:

an obtaining unit, configured to obtain a first reference signal parameter Mn of a target node in a macro neighboring cell and second reference signal parameters Mp corresponding to multiple nodes in a macro serving cell, where the macro serving cell is a cell serving the user equipment UE and the macro neighboring cell is a cell adjacent to the macro serving cell;

a selecting unit, configured to select a preferred Mp that meets a predefined requirement from the Mps corresponding to the multiple nodes; and a triggering unit, configured to trigger a handover procedure if the preferred Mp and the Mn meet a preset handover condition.

A system for handover includes the preceding user equipment UE and a network device applied to a macro serving cell, where:

the user equipment UE further includes:

a receiving unit, configured to receive a get instruction from the macro serving cell; and the network device is configured to: when the user equipment UE is at an edge of the macro serving cell, send a get instruction to the UE, where the get instruction is used to instruct the UE to obtain a first reference signal parameter Mn of a target node in a macro neighboring cell and second reference signal parameters Mp corresponding to multiple nodes in the macro serving cell, and instruct the UE to select a preferred Mp that meets a predefined requirement from the Mps corresponding to the multiple nodes.

It can be seen from the foregoing technical solutions that the embodiments of the present invention have the following advantages:

A preferred Mp that meets a predefined requirement is selected from Mps corresponding to multiple nodes, and then, the preferred Mp is used as a judgment parameter of a preset handover condition, so that a UE performs handover judgment with respect to a CoMP handover scenario. Use an A3 event as an example. According to test data, compared with existing technical solutions, using the preferred Mp as a judgment parameter of the A3 event can increase throughput of a communications system after a UE handover.

BRIEF DESCRIPTION OF DRAWINGS

FIG. 1 is a schematic diagram of a CoMP work scenario in the prior art;

FIG. 2 is a flowchart of a handover method according to a first embodiment of the present invention;

DESCRIPTION OF EMBODIMENTS

Figure 3:
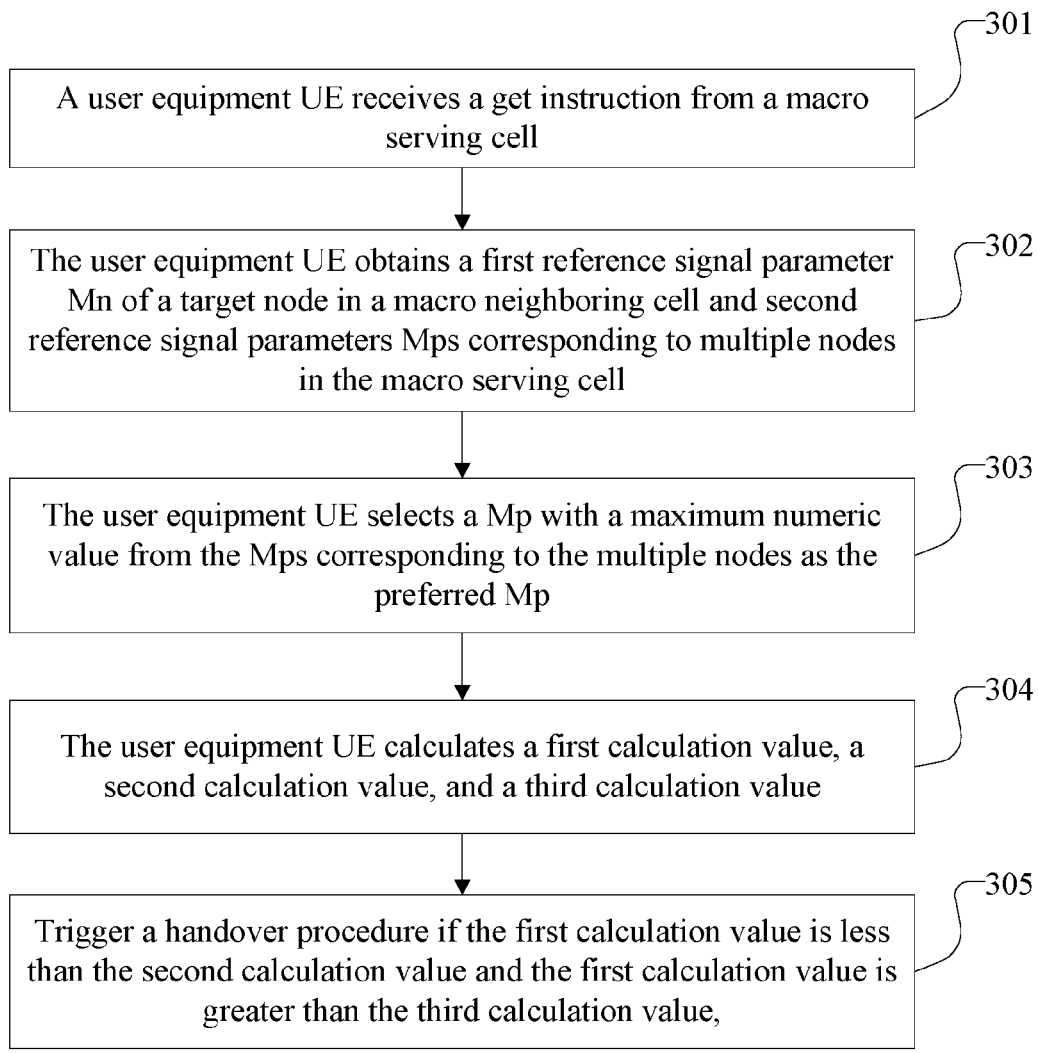
FIG. 3 is a flowchart of a handover method according to a second embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides a handover method, which is used for handover judgment in a CoMP handover scenario. By implementing the handover method in the present invention, throughput of a communications system after a UE handover can be increased. In addition, an embodiment of the present invention further provides a user equipment related to the handover method in the present invention, which will be respectively described in detail in the following.

A first embodiment of the present invention describes a handover method in detail. FIG. 2 shows a specific process of the handover method, which includes:

201. A user equipment UE obtains a first reference signal parameter Mn of a target node in a macro neighboring cell and second reference signal parameters Mp corresponding to multiple nodes in a macro serving cell.

When a UE using a CoMP communication mode is at an edge of a macro serving cell, the UE can normally detect a pilot signal of a target node in a macro neighboring cell. When a pilot signal of the macro serving cell that is detected by the UE is continuously weaker than the pilot signal of the target node in the macro neighboring cell, the UE needs to trigger a handover procedure in CoMP communication mode. In this case, the UE obtains a first reference signal parameter Mn of the target node in the macro neighboring cell and second reference signal parameters Mp corresponding to multiple nodes in the macro serving cell.

The macro serving cell is a cell serving the user equipment UE, and the macro neighboring cell is a cell adjacent to the macro serving cell.

There are in fact multiple nodes in the macro neighboring cell and therefore, the Mn obtained in step 201 is an Mn of a node in the macro neighboring cell that the UE is entering, that is, an Mn of the target node. In the macro serving cell, there are also multiple serving nodes in fact and therefore, the Mps obtained in step 201 are Mps of the multiple serving nodes in the macro serving cell.

Preferably, the UE obtains the preceding parameters by detecting pilot signals. These parameters may also be obtained by using other methods in the prior art, which is not limited herein.

202. The user equipment UE selects a preferred Mp that meets a predefined requirement from the Mps corresponding to the multiple nodes.

As mentioned in step 201, the obtained Mps are the Mps of the multiple serving nodes in the macro serving cell. In this step, the UE selects an Mp that meets the predefined requirement from a set made up of the Mps corresponding to the multiple nodes as the preferred Mp.

The Mp that meets the predefined requirement is obtained through selection according to a preset condition for specifying the Mp value. A serving node corresponding to the preferred Mp that meets the predefined requirement is selected as a serving node in handover judgment, so that the communication effect after a handover can be optimized. For example, an Mp with a maximum numeric value or minimum numeric value in the Mp set may be selected, which is only exemplary without any limitation.

203. Trigger a handover procedure if the preferred Mp and the Mn meet a preset handover condition.

The preferred Mp and the Mn are used as a judgment criterion of the preset handover condition. The UE can trigger the handover procedure if the preferred Mp and the Mn meet the preset handover condition. The handover condition may be the A3 event mentioned in the background or other handover conditions, which is not limited herein.

According to the embodiment, a UE selects a preferred Mp that meets a predefined requirement from Mps corresponding to multiple nodes and then, uses the preferred Mp as a judgment parameter of a preset handover condition, so that the UE performs handover judgment with respect to a CoMP handover scenario. Use an A3 event as an example. According to test data, compared with existing technical solutions, using the preferred Mp as a judgment parameter of the A3 event can increase throughput of a communications system after a UE handover.

A second embodiment of the present invention will provide supplementary description for the handover method in the first embodiment of the present invention. FIG. 3 shows a specific process of the handover method, which includes:

301. A user equipment UE receives a get instruction from a macro serving cell.

When a UE using a CoMP communication mode is at an edge of a macro serving cell, the UE can normally detect a pilot signal of a target node in a macro neighboring cell. When a pilot signal of the macro serving cell that is detected by the UE is continuously weaker than the pilot signal of the target node in the macro neighboring cell, the UE needs to trigger a handover procedure in CoMP communication mode.

The get instruction is used to instruct the UE to obtain a first reference signal parameter Mn of a target node in a macro neighboring cell and second reference signal parameters Mp corresponding to multiple nodes in the macro serving cell, and instruct the UE to select a preferred Mp that meets a predefined requirement from the Mps corresponding to the multiple nodes.

Preferably, the get instruction is a report configuration information element ReportConfigEUTRA. To implement the function in this embodiment of instructing the UE to select the preferred Mp that meets the predefined requirement from the Mps corresponding to the multiple nodes, a new information element needs to be added to the ReportConfigEUTRA:

```
eventA3*            SEQUENCE {
    a3*-Offset              INTEGER (-30..30),
    reportOnLeave BOOLEAN
},
```

Finally the content of the ReportConfigEUTRA is as follows:
ReportConfigEUTRA information element

```
-- ASN1START
ReportConfigEUTRA ::=    SEQUENCE {
triggerType                 CHOICE {
    event                       SEQUENCE {
        eventId                     CHOICE {
            eventA1                     SEQUENCE {
                a1-Threshold                ThresholdEUTRA
            },
            eventA2                     SEQUENCE {
                a2-Threshold                ThresholdEUTRA
            },
            eventA3                     SEQUENCE {
                a3-Offset                   INTEGER (-30..30),
                reportOnLeave               ThresholdEUTRA
            },
            eventA3*                    SEQUENCE {
                a3*-Offset                  INTEGER (-30..30),
                reportOnLeave BOOLEAN
            },
            eventA4                     SEQUENCE {
                a4-Threshold                ThresholdEUTRA
            },
            eventA5                     SEQUENCE {
                a5-Threshold1               ThresholdEUTRA,
                a5-Threshold2               ThresholdEUTRA
            },
            ...,
            eventA6-r10                 SEQUENCE {
                a6-Offset-r10               INTEGER (-30..30),
                a6-ReportOnLeave-r10
```

302. The user equipment UE obtains a first reference signal parameter Mn of a target node in a macro neighboring cell and second reference signal parameters Mp corresponding to multiple nodes in the macro serving cell.

After receiving the get instruction from the macro serving cell, the UE obtains, according to an instruction in the get instruction, the first reference signal parameter Mn of the target node in the macro neighboring cell and the second reference signal parameters Mp corresponding to the multiple nodes in the macro serving cell.

Generally, both the Mp and the Mn include reference signal received power RSRP or reference signal received quality RSRQ, which indicates strength or quality of a pilot signal.

The macro serving cell is a cell serving the user equipment UE, and the macro neighboring cell is a cell adjacent to the macro serving cell.

There are in fact multiple nodes in the macro neighboring cell, and therefore, the Mn obtained in step 302 is an Mn of a node in the macro neighboring cell that the UE is entering, that is, an Mn of the target node. In addition, other parameters of an A3 event, such as an offset Ofn, an offset Ocn, and a design parameter Hys, will be used subsequently. These three are consistent across all nodes in the macro neighboring cell. In the macro serving cell, there are also multiple serving nodes in fact and therefore, the Mps obtained in step 302 are Mps of the multiple serving nodes in the macro serving cell. In addition, other parameters of the A3 event, such as an offset Ofp, an offset Ocp, and a design parameter Off, will be used subsequently. These three are consistent across all nodes in the macro serving cell.

Preferably, the Ofn, the Ocn, the Hys, the Ofp, the Ocp, and the Off are exemplary parameters required for judging whether a preset handover condition is met in this embodiment. In other embodiments, if other preset handover conditions are applied, one or all of the Ofn, the Ocn, the Hys, the Ofp, the Ocp, and the Off may be replaced to other parameters. Therefore, it should be clear that the Ofn, the Ocn, the Hys, the Ofp, the Ocp, and the Off are optional.

Preferably, the UE obtains the preceding parameters by detecting pilot signals. These parameters may also be obtained by using other methods in the prior art, which is not limited herein.

303. The user equipment UE selects an Mp with a maximum numeric value from the Mps corresponding to the multiple nodes as the preferred Mp.

As mentioned in step 302, the obtained Mps are the Mps of the multiple serving nodes in the macro serving cell. In this step, the UE selects an Mp with a maximum numeric value from a set made up of the Mps corresponding to the multiple nodes as the preferred Mp. Step 303 may be expressed by the following expression:

Preferred $Mp=MAX[Mp1,Mp2,Mp3, \ldots ,MpN]$

304. The user equipment UE calculates a first calculation value, a second calculation value, and a third calculation value.

The first calculation value is a sum of the preferred Mp, the Ofp, the Ocp, and the Off, the second calculation value is a value obtained by subtracting the Hys from a sum of the Mn, the Ofn, and the Ocn, and the third calculation value is a sum of the Mn, the Ofn, the Ocn, and the Hys.

A calculation process is as follows:

First calculation value=Preferred $Mp+Ofp+Ocp+Off$;

Second calculation value=$Mn+Ofn+Ocn-Hys$; and

Third calculation value=$Mn+Ofn+Ocn+Hys$.

305. Trigger the handover procedure if the first calculation value is less than the second calculation value and the first calculation value is greater than the third calculation value.

In the prior art, a UE uses an A3 event for handover judgment, which is mentioned in the background. The A3 event includes the following two handover conditions, which respectively are:

Condition for entry: $Mn+Ofn+Ocn-Hys>Mp+Ofp+Ocp+Off$; and

Condition for leave: $Mn+Ofn+Ocn+Hys<Mp+Ofp+Ocp+Off$.

In this embodiment, the basic principle of the A3 event is also utilized, while a condition for obtaining a maximum value from Mp values is added. The solution in the present invention is herein called an enhanced A3 event, including:

Condition for entry: $Mn+Ofn+Ocn-Hys>$Preferred $Mp+Ofp+Ocp+Off$;

Condition for leave: $Mn+Ofn+Ocn-Hys<$Preferred $Mp+Ofp+Ocp+Off$; and

Condition for obtaining a maximum value: Preferred $Mp=MAX[Mp1,Mp2,Mp3, \ldots ,MpN]$.

In this embodiment, the UE selects the Mp with the maximum numeric value from the obtained the Mps corresponding to the multiple nodes as the preferred Mp and then, uses the preferred Mp as a judgment parameter of the A3 event, that is, uses the above enhanced A3 event for handover judgment, so that the UE performs handover judgment with respect to a CoMP handover scenario. According to test data, compared with existing technical solutions, using the preferred Mp as a judgment parameter of the enhanced A3 event can increase throughput of a communications system after a UE handover. According to simulation tests, in this embodiment, the Mp with the maximum numeric value among the Mps corresponding to the multiple nodes is selected as the preferred Mp, which, compared with selecting a minimum numeric value or an average value, can increase throughput of a communications system after a UE handover by 25%.

Figure 4:
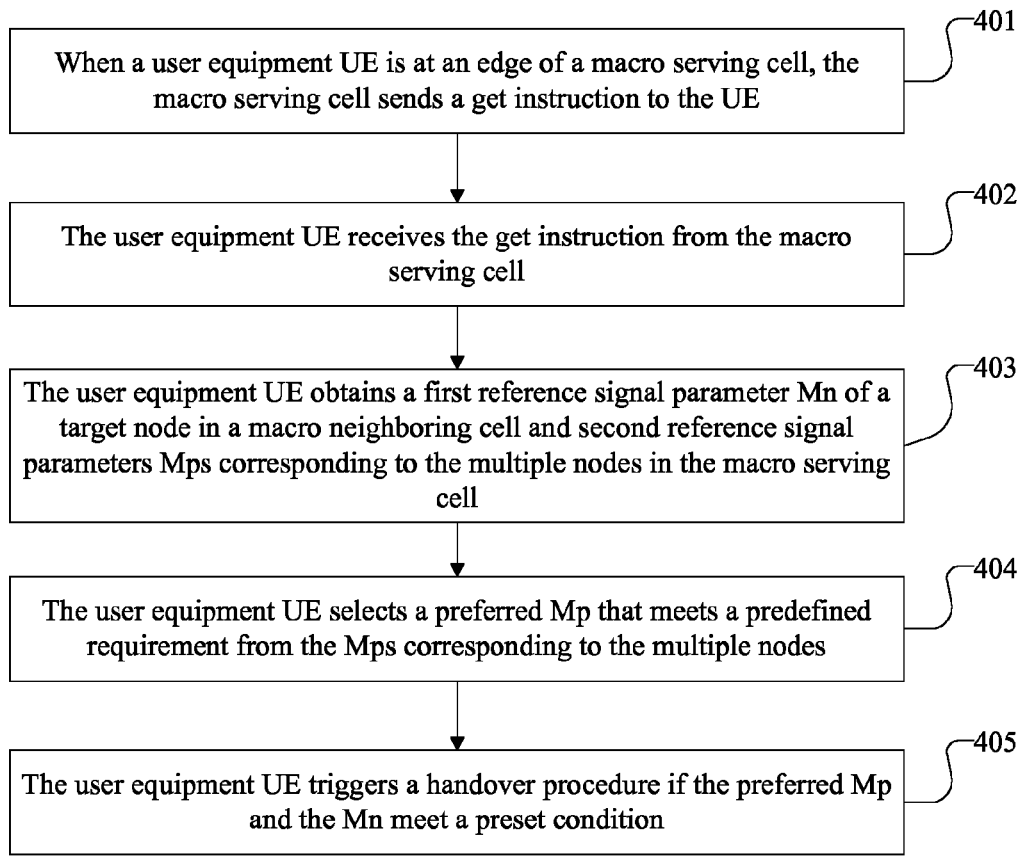
FIG. 4 is a flowchart of another handover method according to a third embodiment of the present invention.

A third embodiment of the present invention describes another handover method in detail. In this embodiment, one or more steps are used to implement one or more steps in the preceding method. Therefore, descriptions of the steps in the preceding method are applicable to corresponding steps in this embodiment. FIG. 4 shows a specific process of the handover method in this embodiment, which includes the following steps:

401. When a user equipment UE is at an edge of a macro serving cell, the macro serving cell sends a get instruction to the UE.

When a UE using a CoMP communication mode is at an edge of a macro serving cell, the UE can normally detect a pilot signal of a target node in a macro neighboring cell. When a pilot signal of the macro serving cell that is detected by the UE is continuously weaker than the pilot signal of the target node in the macro neighboring cell, the UE needs to trigger a handover procedure in CoMP communication mode.

The get instruction is used to instruct the UE to obtain a first reference signal parameter Mn of a target node in a macro neighboring cell and second reference signal parameters Mp corresponding to multiple nodes in the macro serving cell, and instruct the UE to select a preferred Mp that meets a predefined requirement from the Mps corresponding to the multiple nodes.

402. The user equipment UE receives the get instruction from the macro serving cell.

After the macro serving cell sends the get instruction to the UE, the user equipment UE receives the get instruction from the macro serving cell. As mentioned in step 401, the get instruction is used to instruct the UE to obtain the first reference signal parameter Mn of the target node in the macro neighboring cell and the second reference signal parameters Mp corresponding to the multiple nodes in the macro serving cell, and instruct the UE to select the preferred Mp that meets the predefined requirement from the Mps corresponding to the multiple nodes.

403. The user equipment UE obtains the first reference signal parameter Mn of the target node in the macro neighboring cell and the second reference signal parameters Mp corresponding to the multiple nodes in the macro serving cell.

After receiving the get instruction from the macro serving cell, the UE obtains, according to an instruction in the get instruction, the first reference signal parameter Mn of the target node in the macro neighboring cell and the second reference signal parameters Mp corresponding to the multiple nodes in the macro serving cell.

The macro serving cell is a cell serving the user equipment UE, and the macro neighboring cell is a cell adjacent to the macro serving cell.

404. The user equipment UE selects a preferred Mp that meets a predefined requirement from the Mps corresponding to the multiple nodes.

The obtained Mps are Mps of multiple serving nodes in the macro serving cell. In this step, the UE selects an Mp that meets the predefined requirement from a set made up of the Mps corresponding to the multiple nodes as the preferred Mp.

The Mp that meets the predefined requirement is obtained through selection according to a preset condition for specifying the Mp value. A serving node corresponding to the preferred Mp that meets the predefined requirement is selected as a serving node in handover judgment, so that the communication effect after a handover can be optimized. For example, an Mp with a maximum numeric value or minimum numeric value in the Mp set may be selected, which is only exemplary without any limitation.

405. The user equipment UE triggers a handover procedure if the preferred Mp and the Mn meet a preset handover condition.

The preferred Mp and the Mn are used as a judgment criterion of the preset handover condition. The UE can trigger the handover procedure if the preferred Mp and the Mn meet the preset handover condition. The handover condition may be the A3 event mentioned in the background or other handover conditions, which is not limited herein.

According to the embodiment, a UE selects a preferred Mp that meets a predefined requirement from Mps corresponding to multiple nodes and then, uses the preferred Mp as a judgment parameter of a preset handover condition, so that the UE performs handover judgment with respect to a CoMP handover scenario. Use A3 event handover as an example. According to test data, compared with existing technical solutions, using the preferred Mp as a judgment parameter of the A3 event can increase throughput of a communications system after a UE handover.

Figure 5:
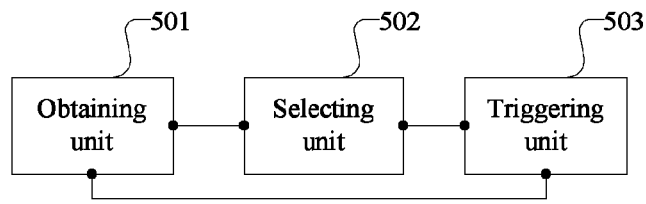
FIG. 5 is a structural diagram of a user equipment according to a fourth embodiment of the present invention.

A fourth embodiment of the present invention describes a user equipment in detail, where the user equipment includes one or more units configured to implement one or more steps in the preceding method. Therefore, descriptions of the steps in the preceding method are applicable to corresponding units of the user equipment. FIG. 5 shows a structure of the user equipment, which includes:

An obtaining unit 501 is configured to obtain a first reference signal parameter Mn of a target node in a macro neighboring cell and second reference signal parameters Mp corresponding to multiple nodes in a macro serving cell.

When a UE using a CoMP communication mode is at an edge of a macro serving cell, the UE can normally detect a pilot signal of a target node in a macro neighboring cell. When a pilot signal of the macro serving cell that is detected by the UE is continuously weaker than the pilot signal of the target node in the macro neighboring cell, the UE needs to trigger a handover procedure in CoMP communication mode. In this case, the obtaining unit 501 of the UE obtains a first reference signal parameter Mn of a target node in the macro neighboring cell and a second reference signal parameters Mp corresponding to multiple nodes in the macro serving cell.

The macro serving cell is a cell serving the user equipment UE, and the macro neighboring cell is a cell adjacent to the macro serving cell.

There are in fact multiple nodes in the macro neighboring cell, and therefore, the Mn obtained by the obtaining unit 501 is an Mn of a node in the macro neighboring cell that the UE is entering, that is, an Mn of the target node. In the macro serving cell, there are also multiple serving nodes in fact and therefore, the Mps obtained the obtaining unit 401 are Mps of the multiple serving nodes in the macro serving cell.

Preferably, the UE obtains the preceding parameters by detecting pilot signals. These parameters may also be obtained by using other methods in the prior art, which is not limited herein.

The obtaining unit 501 is connected to a selecting unit 502 in a communicable manner.

The selecting unit 502 is configured to select a preferred Mp that meets a predefined requirement from the Mps corresponding to the multiple nodes.

As mentioned above, the Mps obtained by the obtaining unit 501 are the Mps of the multiple serving nodes in the macro serving cell. The selecting unit 502 selects an Mp that meets the predefined requirement from a set made up of the Mps corresponding to the multiple nodes as the preferred Mp.

The Mp that meets the predefined requirement is obtained through selection according to a preset condition for specifying the Mp value. A serving node corresponding to the preferred Mp that meets the predefined requirement is selected as a serving node in handover judgment, so that the communication effect after a handover can be optimized. For example, an Mp with a maximum numeric value or minimum numeric value in the Mp set may be selected, which is only exemplary without any limitation.

The selecting unit 502 is connected to a triggering unit 503 in a communicable manner.

The triggering unit 503 is configured to trigger a handover procedure if the preferred Mp and the Mn meet a preset handover condition.

The preferred Mp and the Mn are used as a judgment criterion of the preset handover condition. The UE can trigger the handover procedure if the preferred Mp and the Mn meet the preset handover condition. The handover condition may be the A3 event mentioned in the background or other handover conditions, which is not limited herein.

The triggering unit 503 is connected to the obtaining unit 501 in a communicable manner.

According to the embodiment, the selecting unit 502 of the UE selects a preferred Mp that meets a predefined requirement from Mps corresponding to multiple nodes that are obtained by the obtaining unit 501, and then, the triggering unit 503 uses the preferred Mp as a judgment parameter of a preset handover condition, so that the UE performs handover judgment with respect to a CoMP handover scenario. Use A3 event handover as an example. According to test data, compared with existing technical solutions, using the preferred Mp as a judgment parameter of the A3 event can increase throughput of a communications system after a UE handover.

Figure 6:
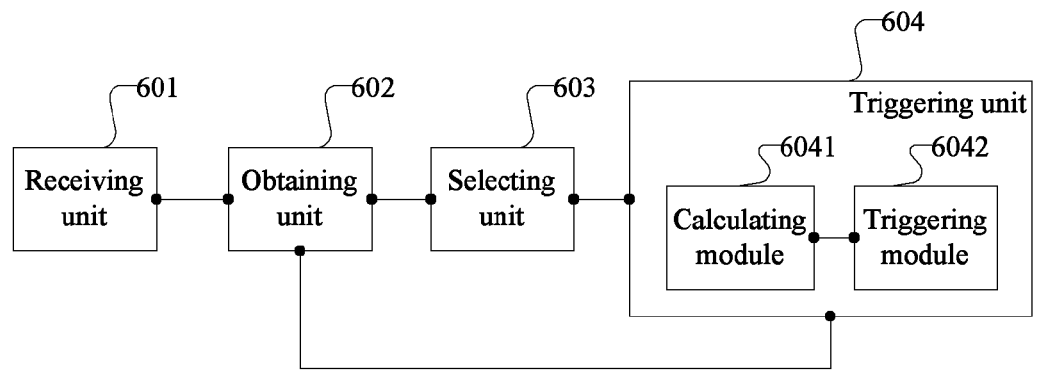
FIG. 6 is a structural diagram of a user equipment according to a fifth embodiment of the present invention.

A fifth embodiment of the present invention will provides supplementary description for the user equipment in the fourth embodiment, which includes one or more units configured to implement one or more steps in the preceding method. Therefore, descriptions of the steps in the preceding method are applicable to corresponding units of the user equipment. FIG. 6 shows a structure of the user equipment, which includes:

A receiving unit 601 is configured to receive a get instruction from a macro serving cell.

When a UE using a CoMP communication mode is at an edge of a macro serving cell, the UE can normally detect a pilot signal of a target node in a macro neighboring cell. When a pilot signal of the macro serving cell that is detected by the UE is continuously weaker than the pilot signal of the target node in the macro neighboring cell, the UE needs to trigger a handover procedure in CoMP communication mode.

The get instruction is used to instruct the UE to obtain a first reference signal parameter Mn of a target node in a macro neighboring cell and second reference signal parameters Mp corresponding to multiple nodes in a macro serving cell, and instruct the UE to select a preferred Mp that meets a predefined requirement from the Mps corresponding to the multiple nodes.

Preferably, the get instruction is a report configuration information element ReportConfigEUTRA. To implement the function in this embodiment of instructing the UE to select the preferred Mp that meets the predefined requirement from the Mps corresponding to the multiple nodes, a new information element needs to be added to the Report-ConfigEUTRA. For the modified ReportConfigEUTRA, refer to a related record in step 301 in the second embodiment of the present invention.

The receiving unit 601 is connected to the obtaining unit 602 in a communicable manner.

The obtaining unit 602 is configured to obtain a first reference signal parameter Mn of a target node in a macro neighboring cell and second reference signal parameters Mp corresponding to multiple nodes in a macro serving cell.

After the receiving unit 601 of the UE receives the get instruction from the macro serving cell, the obtaining unit 602 of the UE obtains, according to the get instruction, the first reference signal parameter Mn of the target node in the macro neighboring cell and the second reference signal parameters Mp corresponding to the multiple nodes in the macro serving cell.

Generally, both the Mp and the Mn include reference signal received power RSRP or reference signal received quality RSRQ, which indicates strength or quality of a pilot signal.

The macro serving cell is a cell serving the user equipment UE, and the macro neighboring cell is a cell adjacent to the macro serving cell.

There are in fact multiple nodes in the macro neighboring cell, and therefore, the Mn obtained by the obtaining unit 602 is an Mn of a node in the macro neighboring cell that the UE is entering, that is, an Mn of the target node. In addition, other parameters of an A3 event, such as an offset Ofn, an offset Ocn, and a design parameter Hys, will be used subsequently. These three are consistent across all nodes in the macro neighboring cell. In the macro serving cell, there are also multiple serving nodes in fact and therefore, the Mps obtained by the obtaining unit 602 are Mps of the multiple serving nodes in the macro serving cell. In addition, other parameters of the A3 event, such as an offset Ofp, an offset Ocp, and a design parameter Off, will be used subsequently. These three are consistent across all nodes in the macro serving cell.

Preferably, the Ofn, the Ocn, the Hys, the Ofp, the Ocp, and the Off are exemplary parameters required for judging whether a preset handover condition is met in this embodiment. In other embodiments, if other preset handover conditions are applied, one or all of the Ofn, the Ocn, the Hys, the Ofp, the Ocp, and the Off may be replaced to other parameters. Therefore, it should be clear that the Ofn, the Ocn, the Hys, the Ofp, the Ocp, and the Off are optional.

Preferably, the UE obtains the preceding parameters by detecting pilot signals. These parameters may also be obtained by using other methods in the prior art, which is not limited herein.

The obtaining unit 602 is connected to a selecting unit 603 in a communicable manner.

The selecting unit 603 is configured to select an Mp with a maximum numeric value from the Mps corresponding to the multiple nodes as the preferred Mp.

As mentioned above, the Mps obtained by the obtaining unit 602 are the Mps of the multiple serving nodes in the macro serving cell. The selecting unit 603 of the UE selects an Mp with a maximum numeric value from a set made up of the Mps corresponding to the multiple nodes as the preferred Mp, which may be expressed by the following expression:

Preferred $Mp=\text{MAX}[Mp1, Mp2, Mp3, \ldots, MpN]$

The selecting unit 603 is connected to a triggering unit 604 in a communicable manner, where the triggering unit 604 is connected to the obtaining unit 602 in a communicable manner.

The triggering unit 604 is configured to trigger a handover procedure if the preferred Mp and the Mn meet a preset handover condition. The triggering unit 604 further includes:

A calculating module 6041 is configured to calculate a first calculation value, a second calculation value, and a third calculation value.

The first calculation value is a sum of the preferred Mp, the Ofp, the Ocp, and the Off, the second calculation value is a value obtained by subtracting the Hys from a sum of the Mn, the Ofn, and the Ocn, and the third calculation value is a sum of the Mn, the Ofn, the Ocn, and the Hys.

A calculation process is as follows:

First calculation value=Preferred $Mp+Ofp+Ocp+Off$;

Second calculation value=$Mn+Ofn+Ocn-Hys$; and

Third calculation value=$Mn+Ofn+Ocn+Hys$.

The calculating unit 6041 is connected to a triggering module 6042 in a communicable manner.

The triggering module 6042 is configured to trigger the handover procedure if the first calculation value is less than the second calculation value and the first calculation value is greater than the third calculation value.

In the prior art, a UE uses an A3 event for handover judgment, which is mentioned in the background. The A3 event includes the following two handover conditions, which respectively are:

Condition for entry: $Mn+Ofn+Ocn-Hys>Mp+Ofp+Ocp+Off$; and

Condition for leave: $Mn+Ofn+Ocn+Hys<Mp+Ofp+Ocp+Off$.

In this embodiment, the basic principle of the A3 event is also utilized, while a condition for obtaining a maximum value from Mp values is added. The solution in the present invention is herein called an enhanced A3 event, including:

Condition for entry: $Mn+Ofn+Ocn-Hys>$Preferred $Mp+Ofp+Ocp+Off$;

Condition for leave: $Mn+Ofn+Ocn-Hys<$Preferred $Mp+Ofp+Ocp+Off$; and

Condition for obtaining a maximum value: Preferred $Mp=\text{MAX}[Mp1, Mp2, Mp3, \ldots, MpN]$.

In this embodiment, the selecting unit 603 of the UE selects the Mp with the maximum numeric value from the Mps corresponding to the multiple nodes that are obtained by the obtaining unit 602 as the preferred Mp, and then, the calculating module 6041 uses the preferred Mp as a judgment parameter of the A3 event and performs handover judgment according to the calculation result and the preceding enhanced A3 event, so that the UE performs handover judgment with respect to a CoMP handover scenario. According to test data, compared with existing technical solutions, using the preferred Mp as a judgment parameter of the enhanced A3 event can increase throughput of a communications system after a UE handover. According to simulation tests, in this embodiment, the Mp with the maximum numeric value among the Mps corresponding to the multiple nodes is selected as the preferred Mp, which, compared with selecting a minimum value or an average value, can increase throughput of a communications system after a UE handover by 25%.

Figure 7:
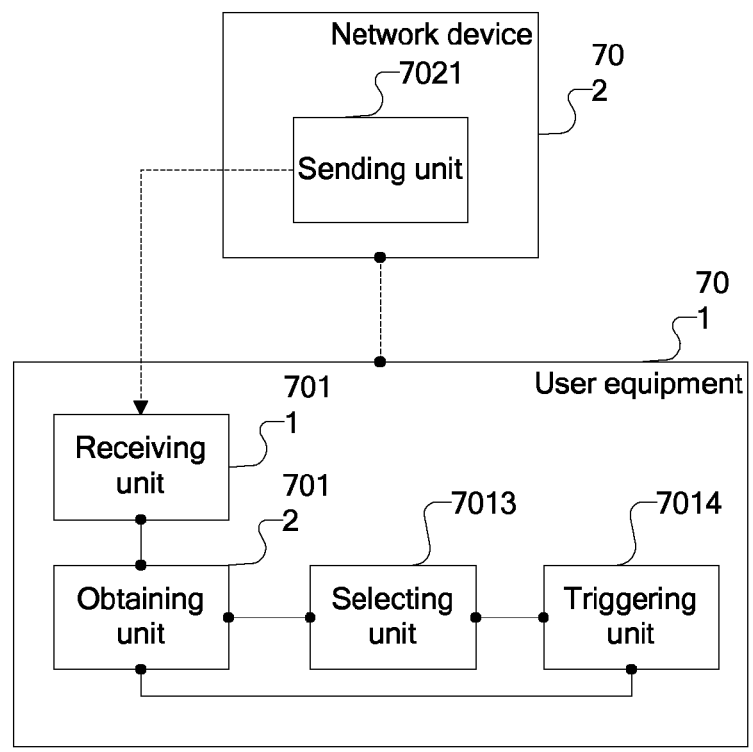
FIG. 7 is a structural diagram of a system for handover according to a sixth embodiment of the present invention.

A sixth embodiment of the present invention describes a system for handover in detail, where the system includes one or more devices configured to implement one or more steps in the preceding method. Therefore, descriptions of the steps in the preceding method are applicable to corresponding devices in the system. FIG. 7 shows a specific structure of the system in this embodiment, which includes a user equipment 701 and a network device 702.

The network device 702 is a network device applied to a macro serving cell, including:

a sending unit 7021, configured to: when the user equipment 701 is at an edge of a macro serving cell, send a get instruction to the user equipment 701, where the get instruction is used to instruct the user equipment 701 to obtain a first reference signal parameter Mn of a target node in a macro neighboring cell and second reference signal parameters Mp corresponding to multiple nodes in a macro serving cell, and instruct the user equipment 701 to select a preferred Mp that meets a predefined requirement from the Mps corresponding to the multiple nodes.

The user equipment 701 includes:

a receiving unit 7011, configured to receive a get instruction from the macro serving cell. After the macro serving cell sends the get instruction to the user equipment 701, the receiving unit 7011 receives the get instruction from the macro serving cell. As mentioned above, the get instruction is used to instruct the UE to obtain the first reference signal parameter Mn of the target node in the macro neighboring cell and the second reference signal parameters Mp corresponding to the multiple nodes in the macro serving cell, and instruct the UE to select the preferred Mp that meets the predefined requirement from the Mps corresponding to the multiple nodes.

In addition to the receiving unit 7011, the user equipment 701 further includes an obtaining unit 7012, a selecting unit 7013, and a triggering unit 7014. For the descriptions of the obtaining unit 7012, the selecting unit 7013, and the triggering unit 7014, refer to related records in the fourth embodiment of the present invention, which are not repeated herein again.

In addition, the user equipment 701 and the network device 702 are connected in a communicable manner, and a specific manner is not limited in the embodiment of the present invention.

According to the embodiment, the selecting unit 7013 of the user equipment 701 selects a preferred Mp that meets a predefined requirement from Mps corresponding to multiple nodes that are obtained by the obtaining unit 7012, and then, the triggering unit 7014 uses the preferred Mp as a judgment parameter of a preset handover condition, so that the UE performs handover judgment with respect to a CoMP handover scenario. Use an A3 event as an example. According to test data, compared with existing technical solutions, using the preferred Mp as a judgment parameter of the A3 event can increase throughput of a communications system after a UE handover.

A person of ordinary skill in the art may understand that, all or a part of the steps of the methods in the embodiments may be implemented by a program instructing relevant hardware. The program may be stored in a computer readable storage medium. The storage medium may be a read-only memory, a magnetic disk, an optical disc, or the like.

The preceding gives a detailed description of a handover method and related user equipment and system that are provided by the present invention. A person of ordinary skill in the art can make modifications or variations with respect to the specific implementation manners and application scopes according to the ideas of the embodiments of the present invention. Therefore, the content of the specification shall not be construed as a limitation to the present invention.

What is claimed is:

1. A handover method, comprising:
obtaining a first reference signal parameter Mn of a target node in a macro neighboring cell and second reference signal parameters Mp corresponding to multiple nodes in a macro serving cell, wherein the macro serving cell is a cell serving a user equipment UE and the macro neighboring cell is a cell adjacent to the macro serving cell;
selecting a preferred Mp with a maximum numeric value from the Mps corresponding to the multiple nodes;
selecting a serving node from among the multiple nodes and corresponding to the selected preferred Mp;
triggering the handover procedure using the selected serving node if the preferred Mp and the Mn meet a preset handover condition.

2. The method according to claim 1, wherein the triggering a handover procedure if the preferred Mp and the Mn meet a preset handover condition comprises:
calculating a first calculation value, a second calculation value, and a third calculation value, wherein the first calculation value is a sum of the preferred Mp, an offset Ofp, an offset Ocp, and a design parameter Off, the second calculation value is a value obtained by subtracting a design parameter Hys from a sum of the Mn, the offset Ofn, and the offset Ocn, and the third calculation value is a sum of the Mn, the offset Ofn, the offset Ocn, and the design parameter Hys; and
triggering the handover procedure if the first calculation value is less than the second calculation value and the first calculation value is greater than the third calculation value.

3. The method according to claim 1, wherein:
the first reference signal parameter Mn and the second reference signal parameter Mp comprise reference signal received power RSRP or reference signal received quality RSRQ.

4. The method according to claim 1, wherein, before the obtaining a first reference signal parameter Mn of a target node in a macro neighboring cell and second reference signal parameters Mp corresponding to multiple nodes in a macro serving cell, the method further comprises:
receiving a get instruction from the macro serving cell, wherein the get instruction is used to instruct the UE to obtain the first reference signal parameter Mn of the target node in the macro neighboring cell and the second reference signal parameters Mp corresponding to the multiple nodes in the macro serving cell, and instruct the UE to select the preferred Mp that meets the predefined requirement from the Mps corresponding to the multiple nodes.

5. The method according to claim 4, wherein:
the get instruction is a report configuration information element ReportConfigEUTRA.

6. A handover method, comprising:
when a user equipment UE is at an edge of a macro serving cell, sending, by the macro serving cell, a get instruction to the UE, wherein the get instruction is used to instruct the UE to obtain a first reference signal parameter Mn of a target node in a macro neighboring cell and second reference signal parameters Mp corresponding to multiple nodes in the macro serving cell, and instruct the UE to select a preferred Mp with a maximum numeric value from the Mps corresponding to the multiple nodes;

receiving, by the UE, the get instruction from the macro serving cell;

obtaining, by the UE, the first reference signal parameter Mn of the target node in the macro neighboring cell and the second reference signal parameters Mp corresponding to the multiple nodes in the macro serving cell, wherein the macro serving cell is a cell serving the UE and the macro neighboring cell is a cell adjacent to the macro serving cell;

selecting, by the UE, the preferred Mp with the maximum numeric value from the Mps corresponding to the multiple nodes;

selecting, by the UE, a serving node from among the multiple nodes and corresponding to the selected preferred Mp; and triggering, by the UE, the handover procedure using the selected serving node if the preferred Mp and the Mn meet a preset handover condition.

7. A user equipment, comprising:
at least one processor; and
at least one memory which stores a plurality of instructions, which when executed by the at least one processor, cause the at least one processor to execute:
  obtaining a first reference signal parameter Mn of a target node in a macro neighboring cell and second reference signal parameters Mp corresponding to multiple nodes in a macro serving cell, wherein the macro serving cell is a cell serving the user equipment UE and the macro neighboring cell is a cell adjacent to the macro serving cell;
  selecting a preferred Mp with a maximum numeric value from the Mps corresponding to the multiple nodes;
  selecting a serving node from among the multiple nodes and corresponding to the selected preferred Mp; and
  triggering the handover procedure using the selected serving node if the preferred Mp and the Mn meet a preset handover condition.

8. The user equipment according to claim 7, wherein the triggering comprises:
  calculating a first calculation value, a second calculation value, and a third calculation value, wherein the first calculation value is a sum of the preferred Mp, an offset Ofp, an offset Ocp, and a design parameter Off, the second calculation value is a value obtained by subtracting a design parameter Hys from a sum of the Mn, the offset Ofn, and the offset Ocn, and the third calculation value is a sum of the Mn, the offset Ofn, the offset Ocn, and the design parameter Hys; and
  triggering the handover procedure if the first calculation value is less than the second calculation value and the first calculation value is greater than the third calculation value.

9. The user equipment according to claim 7, wherein the at least one processor further executes:
  receiving a get instruction from the macro serving cell, wherein the get instruction is used to instruct the UE to obtain the first reference signal parameter Mn of the target node in the macro neighboring cell and the second reference signal parameters Mp corresponding to the multiple nodes in the macro serving cell, and instruct the UE to select the preferred Mp that meets the predefined requirement from the Mps corresponding to the multiple nodes.

* * * * *